(12) United States Patent
Balko et al.

(10) Patent No.: US 9,348,609 B2
(45) Date of Patent: May 24, 2016

(54) FRAMEWORK FOR AD-HOC PROCESS FLEXIBILITY

(75) Inventors: Soeren Balko, Weinheim (DE); Annette Jann, Heidelberg (DE); Sabine Holz, Weinheim (DE); Martin Moeller, Heidelberg (DE)

(73) Assignee: SAP SE, Walldorf (DE)

( * ) Notice: Subject to any disclaimer, the term of this patent is extended or adjusted under 35 U.S.C. 154(b) by 559 days.

(21) Appl. No.: 12/848,679

(22) Filed: Aug. 2, 2010

(65) Prior Publication Data
US 2012/0030573 A1    Feb. 2, 2012

(51) Int. Cl.
| G06F 3/0481 | (2013.01) |
| G06F 3/0482 | (2013.01) |
| G06F 3/0483 | (2013.01) |
| G06F 9/44 | (2006.01) |

(52) U.S. Cl.
CPC ............... *G06F 9/4426* (2013.01); *G06F 8/34* (2013.01)

(58) Field of Classification Search
CPC ..... H04L 41/22; H04L 41/12; H04L 29/0899; H04L 41/145; G06F 3/0481; G06F 3/0482; G06F 3/0483; G06F 9/4446; G06F 3/167
USPC .......................................... 715/810, 764, 735
See application file for complete search history.

(56) References Cited

U.S. PATENT DOCUMENTS

| 5,818,444 | A * | 10/1998 | Alimpich et al. ............. 715/765 |
| 6,321,249 | B1 * | 11/2001 | Nesbitt ................. G06F 9/4411 709/202 |
| 7,337,395 | B2 | 2/2008 | Reinhardt et al. |
| 7,444,310 | B2 * | 10/2008 | Meng et al. ...................... 706/15 |
| 7,461,013 | B2 | 12/2008 | Moeller |
| 7,783,742 | B2 * | 8/2010 | Saha et al. ..................... 709/224 |
| 8,010,900 | B2 * | 8/2011 | Hart et al. ...................... 715/747 |
| 8,245,078 | B1 * | 8/2012 | Chatterjee et al. .............. 714/20 |
| 8,311,688 | B2 * | 11/2012 | Smith et al. ..................... 701/19 |
| 9,154,372 | B2 * | 10/2015 | Richmond ............ G06F 17/245 |
| 2003/0033182 | A1 * | 2/2003 | Stok et al. ........................ 705/7 |
| 2003/0074430 | A1 * | 4/2003 | Gieseke .............. H04L 41/0213 709/221 |
| 2003/0233431 | A1 * | 12/2003 | Reddy ..................... G06F 9/466 709/221 |
| 2004/0201618 | A1 * | 10/2004 | Alderson .......... G06F 17/30902 715/744 |
| 2004/0243921 | A1 * | 12/2004 | Carr et al. ..................... 715/500 |
| 2007/0005618 | A1 * | 1/2007 | Ivanov et al. ................. 707/100 |

(Continued)

OTHER PUBLICATIONS

Wikipedia [online] "Business process management" Last modified Jul. 23, 2010 [Retrieved from the Internet Aug. 2, 2010] <URL: http://en.wikipedia,org/wiki/Business_process_management>.

(Continued)

*Primary Examiner* — Amy Ng
*Assistant Examiner* — Erik Stitt
(74) *Attorney, Agent, or Firm* — Fish & Richardson P.C.

(57) ABSTRACT

The present disclosure involves systems, software, and computer implemented methods for providing a unified runtime framework and graphical, process-centric user interface for ad-hoc business process flexibility. One process includes operations for providing process instances of one or more business processes in a process visualization user interface. A request to initiate an ad-hoc change of a selected process instance is received from the client, and client user interaction options for implementing the ad-hoc change are provided to the client. A selection of a particular user interaction option for implementing the ad-hoc change is received from the client, and the ad-hoc change is implemented.

19 Claims, 7 Drawing Sheets

(56) References Cited

U.S. PATENT DOCUMENTS

| | | |
|---|---|---|
| 2007/0220328 A1* | 9/2007 | Liu et al. .................. 714/24 |
| 2007/0265900 A1* | 11/2007 | Moore ...................... 705/8 |
| 2007/0266377 A1* | 11/2007 | Ivanov ..................... 717/136 |
| 2008/0034039 A1* | 2/2008 | Cisler et al. ............... 709/204 |
| 2008/0306751 A1* | 12/2008 | Conroy et al. ............. 705/1 |
| 2009/0150220 A1 | 6/2009 | Moeller |
| 2009/0271232 A1 | 10/2009 | Waguet et al. |
| 2010/0114631 A1* | 5/2010 | Beaton et al. ............. 705/7 |
| 2010/0115334 A1* | 5/2010 | Malleck et al. ........... 714/15 |

OTHER PUBLICATIONS

IBM "Service Component Architecture" [online] Last modified Nov. 1, 2006 [Retrieved from the Internet Aug. 2, 2010]. <URL: http://www.ibm.com/developerworks/library/specification/ws-sca/>.

OSGi Alliance "OSGi Alliance | Main / OSGi Alliance" [online] [Retrieved from the Internet Aug. 2, 2010] <URL: http://www.osgi.org/Main/HomePage>.

Wikipedia "Enterprise service bus" [online] Last modified Jul. 19, 2010 [Retrieved from the Internet Aug. 2, 2010] <URL: http://en.wikipedia.org/wiki/Enterprise_service_bus>.

\* cited by examiner

FRAMEWORK FOR AD-HOC PROCESS FLEXIBILITY

TECHNICAL FIELD

The present disclosure relates to software, computer systems, and computer implemented methods for providing a unified runtime framework and graphical, process-centric user interface for ad-hoc process flexibility.

BACKGROUND

Companies employ business process management suites (BPMS) to model, document, automate, govern and monitor complex repetitive processes. A process' surrounding conditions and contextual constraints tend to change frequently and rapidly. The changes may include all sorts of suddenly occurring exceptional situations such as short-term changes in legislative regulations and administrative guidelines that are to be obeyed, unexpected resource unavailability which must be compensated for, additional customer requests that should be addressed, suddenly occurring workload peaks that require simplifying processes to successfully handle the workload, and the like. Business process end users face the need to flexibly read on the exceptional situations at low costs while still adhering to the "business goals," such as deliverables or interfaces, of the end-to-end processes they participate in. Companies set themselves apart from their competitive environment by both being able to dynamically adapt to exceptional situations while still taking advantage of the inherent benefits of a BPMS infrastructure (such as monitoring process measures and tracking progress, enforcing mandatory process steps and constraining resource consumption, etc.). Accordingly, process flexibility helps companies broaden the spectrum of BPMS use-cases and, thus, to dramatically improve their "return of investment" on BPMS acquisitions.

Having the means to flexibly adapt processes to exceptional situations opens up a new range of highly dynamic business scenarios to be supported through BPMS technology. In many cases, manually reengineering the underlying process model to incorporate the required changes is impractical as it requires process expert skills for modeling the process from scratch, requires unacceptably high turnaround times, and is, from a user experience point of view, not sufficiently adjusted to the specific contextual situation and process end user role. In particular, it does not guide an end user in performing the needed changes and also does not reduce the inherent complexity of performing process model changes in a full process modeling environment.

SUMMARY

The present disclosure provides techniques for providing a unified runtime framework and graphical, process-centric user interface for ad-hoc business process flexibility. A computer program product is encoded on a tangible storage medium, where the product comprises computer readable instructions for causing one or more processors to perform operations. These operations can include providing process instances of one or more business processes in a process visualization user interface. A request to initiate an ad-hoc change of a selected process instance is received from the client, and client user interaction options for implementing the ad-hoc change are provided to the client. A selection of a particular user interaction option for implementing the ad-hoc change is received from the client, and the ad-hoc change is implemented.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure generally describes computer systems, software, and computer implemented methods for providing a unified runtime framework and graphical, process-centric user interface for ad-hoc process flexibility. Business processes may be executed, modeled, documented, automated, governed, or monitored by Business Process Management Suites (BPMS). After designing a business process, however, the surrounding conditions and contextual constraints associated with the business process may change, and the business process and associated users may need to adapt to the new changes or requirements while still utilizing the benefits of the BPMS infrastructure. Accordingly, a flexible runtime framework and user interface may be implemented to allow a user to dynamically adapt and make changes to a business process at runtime using available components from the BPMS infrastructure. In particular, the runtime framework and user interface may provide a single point of access for performing ad-hoc changes via a lightweight runtime visualization of process instances based on process models. Semantically meaningful changes may be presented to a user and applied to a business process based on contextual information associated with the business process such that the ad-hoc changes applied to the business process are particularly suited for the needs and context of the user. Further, additional guidance may be available to the user for making changes to the business process, such as implicit and explicit constraints that restrict the range of ad-hoc change options and that prevent violation of the basic business intent of the process.

In some implementations, the runtime framework of the present disclosure may plug in various runtime mechanisms to perform an ad-hoc change. First, built-in (i.e. pre-planned) functionality of a BPMS system may be used to perform local changes with limited impact on a process' run (e.g. assigning a different task owner, rolling back an activity, setting back a token, etc.). Second, an extensibility framework can be used to replace process fragments (e.g., activities, subflows, tasks, data mappings, user interfaces, business partners) at well-defined interfaces. Finally, a migration framework where a process instance state is migrated from the original process definition to an altered process definition which enables highly invasive, structural changes may be provided to the user. From a technical infrastructure perspective, the runtime framework of the present disclosure avoids design time and runtime roundtrips where users do not have to edit and re-deploy the underlying process model. The design time and runtime roundtrips generally require additional user interaction and lengthy processing times, which can be avoided with the runtime framework of the present disclosure. The technical implementation and changes, however, are hidden from the end user to provide a joint, easy-to-comprehend, user experience for making ad-hoc changes to a business process. Thus, the present disclosure provides for a homogeneous, process-centric, user-experience which both transparently abstracts from the underlying technical differences of various ad-hoc change options and may dramatically improve understanding of the impact of an ad-hoc change.

A graphical, process-oriented user interface may be presented to allow a user to make the changes to the business process described above. For example, a graphical, Web browser-based process visualization tool that offers a custom choice of ad-hoc change options for a selected running process instance may be provided to a user. Process instances may be visualized in the user interface by displaying the underlying process models in a standard process modeling representation. In addition, other options for making meaningfully targeted ad-hoc changes to a business process may be presented to the user. For instance, some out-of-bound process measures (such as an overdue deadline) for certain process fragments (e.g. tasks, subflows, control flow branches, etc.) may proactively indicate the need to intervene with an ad-hoc change at the corresponding process fragment. Certain constraints may be applied to changes to the business process, such as implicit (e.g., instance based) and explicit (e.g., model based) constraints, to prevent a user from altering the business process beyond the logical bounds of the overall process framework. Implicit constraints include constraints that are applicable to a process instance based on the particular state that the process instance is in. For example, a process instance may be in a state in which the process instance has already progressed to a particular branch of the process model. Accordingly, in view of the current state of the process instance, an implicit constraint may prevent certain changes to the business process, such as removal of the process branch. Explicit constraints include constraints that are applicable to a process model and are business rules that are generally complied with for each process instance associated with the process model.

One potential benefit of the unified runtime framework and graphical, process-centric user interface of the present disclosure is that a user may easily make ad-hoc changes to a business process without technical knowledge of the underlying components of business processes. For example, in response to altered conditions related to a business process, the user may need to make particular changes to components associated with the business process. Various options may be presented to the user through a user interface, even at runtime of the business process, such that the user can flexibly adapt to situational changes involving the business process. Thus, the user may not need to re-design components of the business process and may, using the unified runtime framework, implement changes to the business process at runtime that address the user's particular need within a certain business context. If a particular business process has already been initiated, for example, the runtime framework may allow the user to make changes to the business process without repeating previously-performed steps of the business process.

In some implementations, the unified runtime framework and user interface may provide additional guidance to the user such as applying constraints that prevent the user from implementing changes outside the scope of a business process or educating the user of interdependencies between components of the business process. Accordingly, the unified runtime framework and user interface may provide a homogeneous and intuitive user interface for performing ad-hoc process changes in a time-efficient manner. Additionally, the runtime framework and user interface may facilitate guided flexibility for process users by providing constrained selection of change options and implementing the necessary runtime support for transparently changing running process instances in an ad-hoc manner without having to manually perform a full design time and runtime iteration. Different methods for modifying parameters of a business process and various available resources, such as pre-existing resources provided in an underlying platform such as a BPMS system, are aggregated by the runtime framework and user interface into a single tool to allow a user without technical knowledge of the underlying business process framework to implement changes to the business process at runtime.

Figure 1:
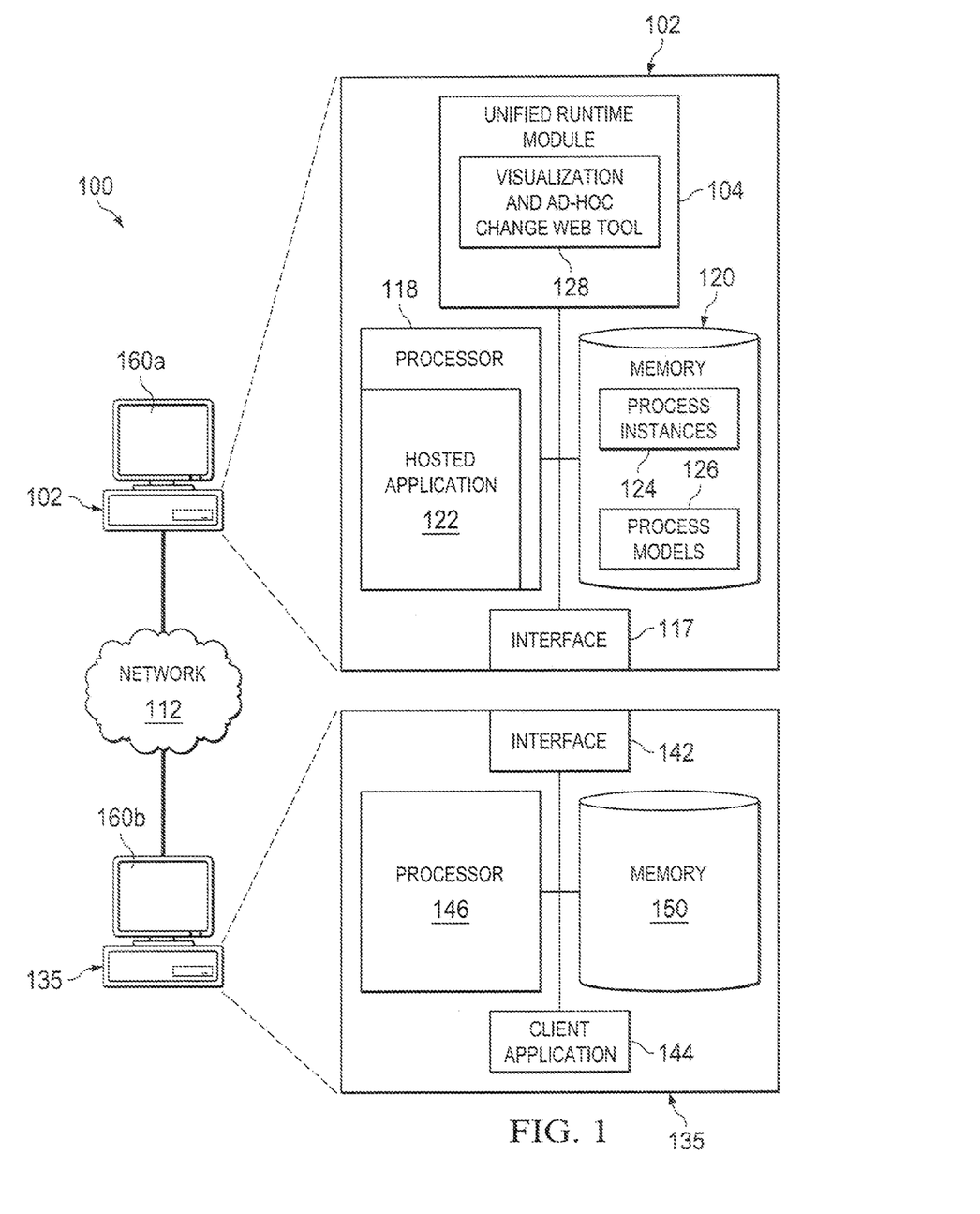
FIG. 1 illustrates an example environment implementing various features of a unified runtime framework and graphical, process-centric user interface for ad-hoc process flexibility.

Turning to the illustrated example, FIG. 1 illustrates an example environment 100 for providing a unified runtime framework and graphical, process-centric user interface for ad-hoc process flexibility. The illustrated environment 100 includes or is communicably coupled with server 102 and one or more clients 135, at least some of which communicate across network 112. In general, environment 100 depicts an example configuration of a system capable of providing a unified runtime framework and graphical, process-centric user interface for ad-hoc process flexibility. The environment 100 also supports one or more servers operable to provide a set of services to the client 135 or server 102 in which the one or more servers can be logically grouped and accessible within a cloud computing network. Accordingly, the unified runtime framework and graphical, process-centric user interface may be provided to a client 135 or server 102 as an on-demand solution through the cloud computing network or as a traditional server-client system. Further, the environment 100 also supports a BPMS system operated by one or more web application servers. Different components of the BPMS system may be used to support ad-hoc runtime changes to a business process.

In general, server 102 is any server that stores one or more hosted applications 122, where at least a portion of the hosted applications 122 are executed via requests and responses sent to users or clients within and communicably coupled to the illustrated environment 100 of FIG. 1. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the server 102 may store a plurality of various hosted applications 122, while in other instances, the server 102 may be a dedicated server meant to store and execute only a single hosted application 122. In some instances, the server 102 may comprise a web server or be communicably coupled with a web server, where the hosted applications 122 represent one or more web-based applications accessed and executed via network 112 by the clients 135 of the system to perform the programmed tasks or operations of the hosted application 122.

At a high level, the server 102 comprises an electronic computing device operable to receive, transmit, process, store, or manage data and information associated with the environment 100. The server 102 illustrated in FIG. 1 can be responsible for receiving application requests from one or more client applications 144 or business applications associated with the clients 135 of environment 100 and responding to the received requests by processing said requests in the associated hosted application 122, and sending the appropriate response from the hosted application 122 back to the requesting client application 144. Alternatively, the hosted application 122 at server 102 can be capable of processing and responding to local requests from a user accessing server 102 locally. Accordingly, in addition to requests from the external clients 135 illustrated in FIG. 1, requests associated with the hosted applications 122 may also be sent from internal users, external or third-party customers, other automated applications, as well as any other appropriate entities, individuals, systems, or computers. Further, the terms "client application" and "business application" may be used interchangeably as appropriate without departing from the scope of this disclosure.

As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the illustrated implementation, and as shown in FIG. 1, the server 102 includes a processor 118, an interface 117, a memory 120, one or more hosted applications 122, and a runtime module 104. The interface 117 is used by the server 102 for communicating with other systems in a client-server or other distributed environment (including within environment 100) connected to the network 112 (e.g., client 135, as well as other systems communicably coupled to the network 112). Although FIG. 1 depicts a server-client environment, other implementations of the runtime framework for providing ad-hoc changes are within the scope of the present disclosure. For example, the runtime framework may be provided or accessed locally at a computer. Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated environment 100.

In some implementations, the server 102 may also include a user interface, such as a graphical user interface (GUI) 160*a*. The GUI 160*a* comprises a graphical user interface operable to, for example, allow the user of the server 102 to interface with at least a portion of the platform for any suitable purpose, such as creating, preparing, requesting, or analyzing data, as well as viewing and accessing source documents associated with business transactions. Generally, the GUI 160*a* provides the particular user with an efficient and user-friendly presentation of business data provided by or communicated within the system. The GUI 160*a* may comprise a plurality of customizable frames or views having interactive fields, pull-down lists, buttons, and other controls operated by the user. For example, GUI 160*a* may provide interactive elements that allow a user to enter or select elements of business process instances in GUI 160*a*. More generally, GUI 160*a* may also provide general interactive elements that allow a user to access and utilize various services and functions of application 122. The GUI 160*a* is often configurable, supports a combination of tables and graphs (bar, line, pie, status dials, etc.), and is able to build real-time portals, where tabs are delineated by key characteristics (e.g. site or micro-site). Therefore, the GUI 160*a* contemplates any suitable graphical user interface, such as a combination of a generic web browser, intelligent engine, and command line interface (CLI) that processes information in the platform and efficiently presents the results to the user visually.

Generally, example server 102 may be communicably coupled with a network 112 that facilitates wireless or wireline communications between the components of the environment 100 (i.e., between the server 102 and client 135 as well as between servers 140 and 102 or workstations 170), as well as with any other local or remote computer, such as additional clients, servers, or other devices communicably coupled to network 112 but not illustrated in FIG. 1. In the illustrated environment, the network 112 is depicted as a single network in FIG. 1, but may be comprised of more than one network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the client 135 and the server 102. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations. The network 112, however, is not a required component of the present disclosure.

As illustrated in FIG. 1, server 102 includes a processor 118. Although illustrated as a single processor 118 in FIG. 1, two or more processors may be used according to particular needs, desires, or particular embodiments of environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of server 102 and, specifically, the one or more plurality of hosted applications 122. Specifically, the server's processor 118 executes the functionality required to receive and respond to requests from the clients 135 and their respective client applications 144, as well as the functionality required to perform the other operations of the hosted application 122.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 118 executes one or more hosted applications 122 on the server 102.

At a high level, each of the one or more hosted applications 122 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 122 may be located at a particular server 102. In others, a plurality of related and/or unrelated hosted applications 122 may be stored at a single server 102, or located across a plurality of other servers 102, as well. In certain cases, environment 100 may implement a composite hosted application 122. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 122 may represent web-based applications accessed and executed by remote clients 135 or client applications 144 via the network 112 (e.g., through the Internet). Further, while illustrated as internal to server 102, one or more processes associated with a particular hosted application 122 may be stored, referenced, or executed remotely. For example, a portion of a particular hosted application 122 may be a web service associated with the application that is remotely called, while another portion of the hosted application 122 may be an interface object or agent bundled for processing at a remote client 135. Moreover, any or all of the hosted applications 122 may be a child or sub-module of another software module or enterprise application (not illustrated) without departing from the scope of this disclosure. Still further, portions of the hosted application 122 may be executed by a user working directly at server 102, as well as remotely at client 135.

As illustrated, processor 118 can also execute a unified runtime module 104 that provides an environment and user interface for presenting to a user of client application 144 options for applying ad-hoc changes to a business process at runtime of the business process. In some implementations, the unified runtime module 104 can be executed by a different processor or server external to server 102, such as by a server communicably coupled to server 102 through network 112. For example, the unified runtime module 104 may be provided as an on-demand service through a cloud computing network, as a web service accessible via network 112, or as a service provided on a dedicated server. The unified runtime module 104 can provide interfaces, modules, services, or metadata definitions that enable client application 144 to provide support for implementing ad-hoc changes to a business process executed at server 102 or at a different server or workstation. In the present disclosure, a business process may be any collection of related activities, tasks, or sequential steps performed in association with a particular business context, business partner, or customer. Business processes may be performed in software as a computer program and/or in connection with a computer microprocessor, server, workstation, instance of a computer program, thread of execution within a computer program, or other data processing element. Each business process may be associated with a workflow, and each distinct case or occurrence of the workflow or a portion of the workflow may be a separate process instance of a particular business process.

In the illustrated example, the unified runtime module 104 may also provide a process visualization and ad-hoc change web tool 128 for presenting graphical tools to a user for selecting and applying ad-hoc changes to a business process. Although the ad-hoc change web tool 128 is described in the present disclosure as a tool utilizing web-based technologies, other implementations of the ad-hoc change web tool, such as implementing ad-hoc changes without necessarily using a web-based tool, are within the scope of the present disclosure. The ad-hoc change web tool 128 provides a single point of access for performing ad-hoc changes via a lightweight runtime visualization of process instances based on process models. For example, the runtime visualization may include rendering of the process model as a graph using Business Process Modeling Notation (BPMN) elements and contextual enrichment of instance data. The contextual enrichment of instance data may include, for example, depictions of the consumption of resources throughout the process instance, status indicators, runtime durations, involved users, or outcome of previous steps in the process instance. In some implementations, the ad-hoc change web tool 128 is available to a user through a web browser-based application at client 135.

The unified runtime module 104 may also present and apply semantically meaningful changes to a business process based on contextual information associated with the business process and the user. Further, the unified runtime module 104 may provide additional guidance to the user for making changes to the business process, such as implicit and explicit constraints that restrict the range of ad-hoc change options and inhibit violation of the basic business intent of the process, as formulated in business rules and in the process template. The implicit constraints include restrictions that are imposed due to a particular state of the process instance, such as prohibiting removal of certain process steps after the process instance has progressed beyond those process steps. The explicit constraints include modeled business rules that are part of the process template and that generally apply to all process instances based on that process template. The unified runtime environment 104 may be separate from hosted application 122, while in other instances, the unified runtime module 104 may be embedded within or part of a particular one or more hosted applications.

The unified runtime module 104 and ad-hoc change tool 128 provide various mechanisms for adapting a business process instance at runtime. These mechanisms are described in further detail below in connection with FIG. 2 and generally include: (1) dynamic configuration of a process instance by calling existing APIs of various components within a BPMS stack (e.g., task management, user management, etc.); (2) extensibility through late binding mechanisms (replacing process building blocks such as automated activities, user tasks, or sub processes with other process building blocks at their interface boundaries); and (3) migrating process instance data from one process template (or process model) to another process template that is dynamically generated at runtime. The terms "process template" and "process model" may be used interchangeably as appropriate without departing from the scope of this disclosure. By allowing for ad-hoc changes at runtime, the ad-hoc change tool 128 bypasses a runtime-design time roundtrip. Accordingly, the total cost of ownership and the turnaround times required for performing changes to a process instance are significantly reduced. Further, the unified runtime module 104 provides a level of abstraction to a user for implementing the ad-hoc changes and reduces the user expertise required for making such changes. Additionally, the unified runtime module 104 can provide a unified user interface for performing the process adaptations which abstracts from the specific adaptation mechanisms and is dynamically adapted to the contextual situation. For example, the ad-hoc change tool 128 may specifically suggest the change options that are permissible for a particular user or that are applicable to a current process instance.

In general, the server 102 also includes memory 120 for storing data and program instructions. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 122.

Memory 120 may also store data objects such as process models 126 used by the unified runtime module 104. For example, a particular process model 126 may include process model definitions and parameters associated with a particular business process. The process models 126 may be retrieved from memory 120 when the unified runtime module 104 is applying an ad-hoc change to a business process, including a change that may require creation of an entirely new process model and migration of the modified process instance from the original process model to the new process model. During a process instance migration, the original process model may be retrieved from the store of process models 126 in memory 120 and used as a basis for defining parameters in the new process model along with the additional changes requested by the user. Memory 120 may also store information associated with process instances 124. The process instances 124 may be retrieved from a runtime environment during modification of a business process, such as an ad-hoc change based on built-in change operations within an underlying BPMS system. A process instance can consist of variables that hold the status of a particular process. The variables capture the progress of control and data flows using elements such as instruction pointers and variables holding instances of business documents that were manipulated during execution of the process.

The illustrated environment of FIG. 1 also includes one or more clients 135. Each client 135 may be any computing device operable to connect to or communicate with at least the server 102 and/or via the network 112 using a wireline or wireless connection. Further, as illustrated in FIG. 1, client 135 includes a processor 146, an interface 142, a graphical user interface (GUI) 160b, a client application 144, and a memory 150. In general, client 135 comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes one client 135, alternative implementations of environment 100 may include multiple clients communicably coupled to the server 102, or any other number of clients suitable to the purposes of the environment 100. Additionally, there may also be one or more additional clients 135 external to the illustrated portion of environment 100 that are capable of interacting with the environment 100 via the network 112. Further, the terms "client" and "user" may be used interchangeably as appropriate without departing from the scope of this disclosure. Moreover, while each client 135 is described in terms of being used by a single user, this disclosure contemplates that many users may use one computer, or that one user may use multiple computers.

The GUI 160b associated with client 135 comprises a graphical user interface operable to, for example, allow the user of client 135 to interface with at least a portion of the platform for any suitable purpose, such as creating, preparing, requesting, or analyzing data, as well as viewing and accessing source documents associated with business transactions. Generally, the GUI 160b provides the particular user with an efficient and user-friendly presentation of business data provided by or communicated within the system. The GUI 160b may comprise a plurality of customizable frames or views having interactive fields, pull-down lists, and buttons operated by the user. For example, GUI 160a may provide interactive elements that allow a user to enter or select elements of business process instances in GUI 160b. The visualization and ad-hoc change web tool 128 may be presented and accessible to the user through GUI 160b, such as through a web browser, for example. The business process steps, interdependencies and ad-hoc change options may be graphically rendered by the ad-hoc change web tool 128 and presented in GUI 160b. Further, the user may request ad-hoc changes to a business process, select from a number of ad-hoc change options available for a particular business process, and apply a selected ad-hoc change to a particular business process through GUI 160b. More generally, GUI 160b may also provide general interactive elements that allow a user to access and utilize various services and functions of application 144. The GUI 160b is often configurable, supports a combination of tables and graphs (bar, line, pie, status dials, etc.), and is able to build real-time portals, where tabs are delineated by key characteristics (e.g. site or micro-site). Therefore, the GUI 160b contemplates any suitable graphical user interface, such as a combination of a generic web browser, intelligent engine, and command line interface (CLI) that processes information in the platform and efficiently presents the results to the user visually.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted application 122) or the client 135 itself, including digital data, visual information, the client application 144, or the GUI 160b. Both the input and output device may include fixed or removable storage media such as a magnetic storage media, CD-ROM, or other suitable media to both receive input from and provide output to users of client 135 through the display, namely, the GUI 160b.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing a hosted application at server 102 that can be accessed by client computer 135, in some implementations, server 102 executes a local application that features an application UI accessible to a user directly utilizing GUI 160a. Further, although FIG. 1 depicts a server 102 external to network 112, servers may be included within the network 112 as part of a cloud network solution, for example. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
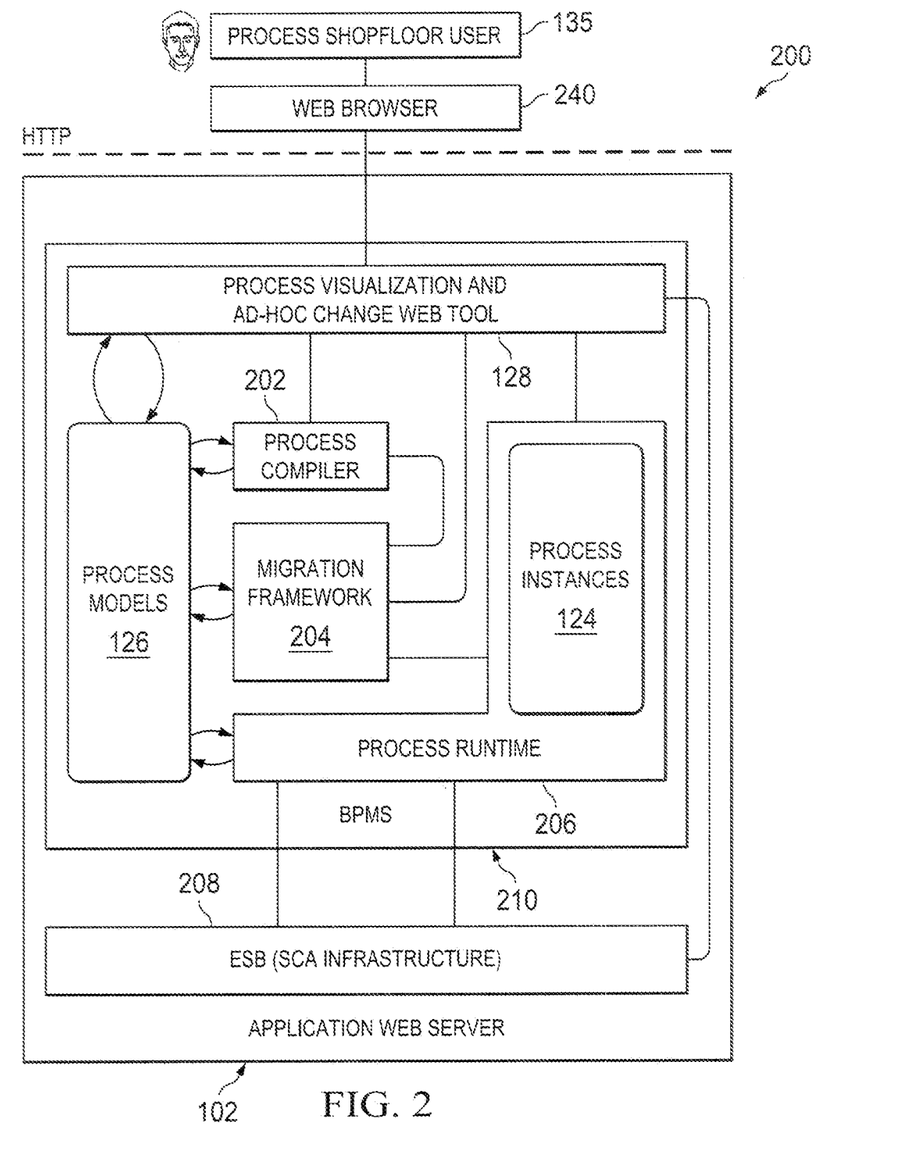
FIG. 2 is an example environment depicting BPMS runtime components used in providing a unified runtime framework and graphical, process-centric user interface using an appropriate system, such as the system described in FIG. 1.

FIG. 2 illustrates an example environment 200 depicting BPMS runtime components used in providing a unified runtime framework and graphical, process-centric user interface for ad-hoc process flexibility. As described above, business processes may be implemented in a BPMS system, and the unified runtime module 104 may utilize components provided by a BPMS system to allow ad-hoc changes to a business process at runtime. A particular user at client 135, for example, may execute a client application 144 associated with a business process. A web browser 240 may be used to perform tasks within the client application 144 in connection with a hosted application 122, or the web browser 240 may be used for other purposes such as to access resources external to the client application 144. During use of client application 144, the user may access a process visualization and ad-hoc change web tool 128 through a user interface presented in web browser 240 in order to implement changes in a particular business process. The user may select from a number of different process instances presented to the user or, alternatively, the user may select a particular business process that may be associated with many process instances for applying an ad-hoc change. In other words, the user can decide whether the ad-hoc change applies to a single process instance or to many process instances. The process instances or business processes presented to the user may be graphically represented through the web browser 240 using process visualization and ad-hoc change web tool 128. The user may be presented with a selection of different possible changes to one or more business processes, and the user's selection of a particular change may be sent to the ad-hoc change web tool 128. The ad-hoc change web tool 128 may be provided within a BPMS system residing on a web application server 102, such as the BPMS system 210 depicted in FIG. 2. In general, a BPMS system may include software designed to support business processes that may be associated with multiple enterprise applications, corporate departments, business entities, or other entities over a network. BPMS software can, in some instances, facilitate the building, optimizing, and managing of different process applications in a particular business context.

Depending on the user's need in a particular situation, the request for a change in a business process may be routed from the ad-hoc change web tool 128 to different underlying runtime frameworks within the BPMS system 210. For example, the user may only need to make a limited change to the business process such as repeating a previous state of a current process instance. The change with limited scope may be performed exclusively using existing interfaces of the BPMS system 210 without altering the underlying process template. The ad-hoc change web tool 128 may determine that the change selected by the user is a change of limited scope, and the request for the limited change may be routed via an application programming interface (API) to the process runtime environment 206 to access a repository of process instances 124. The specific process instance to be altered may be retrieved from the process instances repository 124 for changes implemented by the user. These change operations may be options inherent to certain business processes and performed through APIs available to other BPMS components. In some instances, the BPMS runtime environment 206 includes various components, such as task management, context management, process management, data mapping engines, and other modules that already offer limited modification options for business processes. For example, a task management module in the BPMS runtime environment 206 allows assigning of tasks to different users, a user management module can change resolution rules for a user role that is referenced from the process, a process management module permits skipping or repeating of process steps, and a data mapping engine provides alternative implementations of a data mapping function. The ad-hoc change web tool 128 may aggregate the various change options from the different components within the BPMS runtime environment 206 into a single user-friendly tool for selection by the user. Further, the ad-hoc change web tool 128 can dynamically filter the change options and determine the appropriate change options for a particular situation based on the applicability of the change options in the current context. The determination of the appropriate change options may be based on, for example, any applicable implicit or explicit constraints or the role of the user performing the ad-hoc change and the user's privileges.

Alternatively, requests for more substantial changes to a business process may be routed to the extensibility framework 208 and the process compiler 202, as depicted in FIG. 2. If the user has requested that a process step associated with the business process be replaced with a different process step, for example, the ad-hoc change web tool 128 may access the extensibility framework 208 to perform the change. In some implementations, the extensibility framework 208 may be a service provided by the underlying web application server 102 via an enterprise service bus (ESB), apart from the BPMS system 210. The extensibility framework 208 may allow for customizing composite applications that publish associated building blocks (including the corresponding technical interfaces) using extensible component models such as Service Component Architecture (SCA) or an OSGi framework, for example. In certain implementations, the extensibility framework 208 may allow for rewiring of components or process fragments, such as tasks, data mappings, activities, subflows, and other components, such that in effect, one activity or application extension within a process instance may be replaced with another activity that shares the same interface. In other words, certain interfaces associated with process fragments may be particularly well-defined and, accordingly, suitable for replacement via the extensibility framework 208. For example, a user task that provides a different user interface or has different deadlines, but may gather the same data may have the same technical interface and may accordingly be suitable to replace a different user task of the same technical interface. The process fragments may be generated and compiled at process compiler 202 after it is registered with an SCA infrastructure such as extensibility framework 208 as a replacing component. Based on user input, the ad-hoc tool 128 may not only select from pre-existing process fragment templates but also generate those templates from patterns by incorporating user input on the fly. For instance, the tool 128 may generate a user task by generating the associated UI from (1) a user-provided business document structure (i.e., a list of items that are to be displayed or edited in the present task) and (2) a user-provided list of potential task processors.

The user may also request substantial, invasive changes to the business process through the ad-hoc change web tool 128. Certain changes to the business process, such as re-ordering of certain steps or removing of entire process branches, may require extensive modifications that are not possible using the methods described above. Examples of substantial changes may include adding control flow branches or changing activity interfaces, which may require the migration of the original process model to a new process model. In such instances, the user's changes are made through a migration framework 204. The migration framework 204 may initially create an entirely new process model using the original business process definitions as a starting point but incorporating the substantial changes made by the user. Here, the migration framework 204 may utilize the repository of process models 126 to retrieve information associated with the process model of the current process instance or the process compiler 202 to generate the new process model. The current running process instance may be suspended and migrated to the new process model by transferring the entire instance state, including the process container variables, instance tokens, and other elements of the current process model such as control flow progress indicators, to the new model. The migration framework 204 may initiate compiling of the altered process model, fetching the running process instance status from the process runtime and moving it to the new process model.

Figure 3:
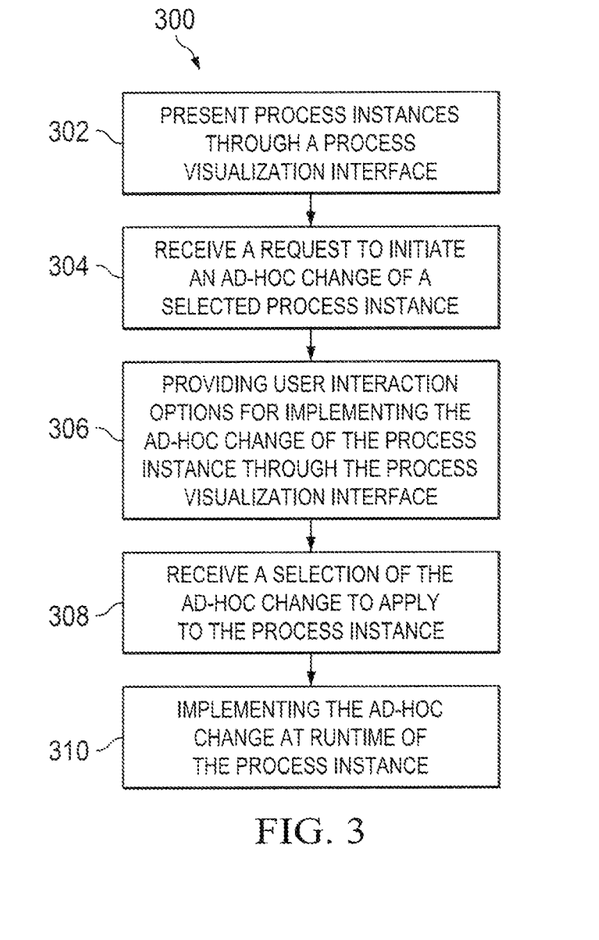
FIG. 3 is a flow chart depicting an example process for providing access to remote applications to make ad-hoc changes of application instances at runtime using an appropriate system, such as the system described in FIG. 1.

FIG. 3 is a flow chart 300 depicting an example process for providing access to remote applications to make ad-hoc changes of application instances at runtime. First, process instances are presented to a client through a process visualization user interface at 302. The process visualization user interface may be a graphical, web browser-based process visualization tool, such as Ad-Hoc Change Web Tool 128 for example, offering a custom choice of ad-hoc change options for a selected running process instance. Process instances may be visualized in the user interface by means of displaying the underlying process models in a standard process modeling representation such as Business Process Modeling Notation (BPMN), Event-driven Process Chain (EPC), Unified Modeling Language (UML) Activity Diagrams, and the like. In some implementations, light-weight process visualizations (like a plain value chain), tailored to the specific end-user role may be used. The light-weight process visualizations may include visualizing reduced views onto the process models that represent a pre-selected subset of tasks and activities, according to a number of criteria (like end user view privileges, process step relevance, etc.).

The displayed process model may be supplemented with progress indicators and other process measures, such as run time durations, resource consumption, to provide guidance in performing meaningfully targeted ad-hoc changes. For instance, some out-of-bound process measures (such as an overdue deadline) for certain process fragments (e.g. tasks, subflows, control flow branches, etc.) may pro-actively indicate the need to intervene with an ad-hoc change at the corresponding process fragment. Complementing this aspect, the web-based tool 128 of the present disclosure also provides for both implicit (e.g., instance based) and explicit (e.g., model based) constraints which apply to the range of offered ad-hoc change options. For instance, the process' progress may implicitly inhibit performing changes to already expired (e.g., upstream) process fragments and the end user role may explicitly exclude certain change options where tasks owners may only be allowed to make changes to the tasks they are involved in whereas process owners can perform more intrusive changes like removing, adding or reordering activities to the process.

Next, a request is received to initiate an ad-hoc change of a selected process instance at 304. The ad-hoc change may be a modification of a component, parameter, condition, or other element of a process instance that is implemented after design time of the process instance, such as at runtime of the process instance. For example, sudden changes in business requirements, customer requests, workload peaks, resource availability, legislative regulations, escalation scenarios in which exceptional situations require responsive action, or other conditions may require a user to modify a previously defined business process at runtime to adapt to the changing conditions. The user may select a particular process instance presented in the process visualization interface for modification using an appropriate mechanism such as ad-hoc change web tool 128, for example.

After receiving the request to initiate an ad-hoc change of a selected process instance, user interaction options for implementing the ad-hoc change are provided through the process visualization interface at 306. The user interaction options may include change options of different types or levels of intrusion on the process instances that may be applied to the process instances. The ad-hoc change tool 128, however, may provide the change options with a level of abstraction from the levels of intrusion on the process instances such that the user does not need to understand the underlying mechanics. For example, change options of three types may be presented through the ad-hoc change web tool 128: (1) change options that utilize built-in functionality to perform local changes with limited impact on the process run (e.g. assigning a different task owner, rolling back an activity, setting back a token, etc.); (2) change options that use an extensibility framework 208 to replace process fragments (like activities, subflows, tasks, data mappings, user interfaces, business partners) at well-defined interfaces; and (3) change options that provide for a migration framework 204 where a process instance state is migrated from the original process definition to an altered process definition which enables highly invasive, structural changes. Other user interaction options presented to the user may include the option to derive the underlying technical differences of various ad-hoc change options in a manner that dramatically improves the user's understanding of the impact of an ad-hoc change. In other words, the ad-hoc change web tool 128 may present a homogeneous, process-centric user-experience to assist the user in making ad-hoc changes to a business process that are specific to the user's need.

Finally, the user's selection of the ad-hoc change to apply to the process instance is received at 308 and implemented at runtime of the process instance at 310. Depending on the type of the ad-hoc change selection received from the user, a particular runtime framework may be used for applying the ad-hoc change selected by the user to the process instance, as described above in connection with FIG. 2.

Figure 4:
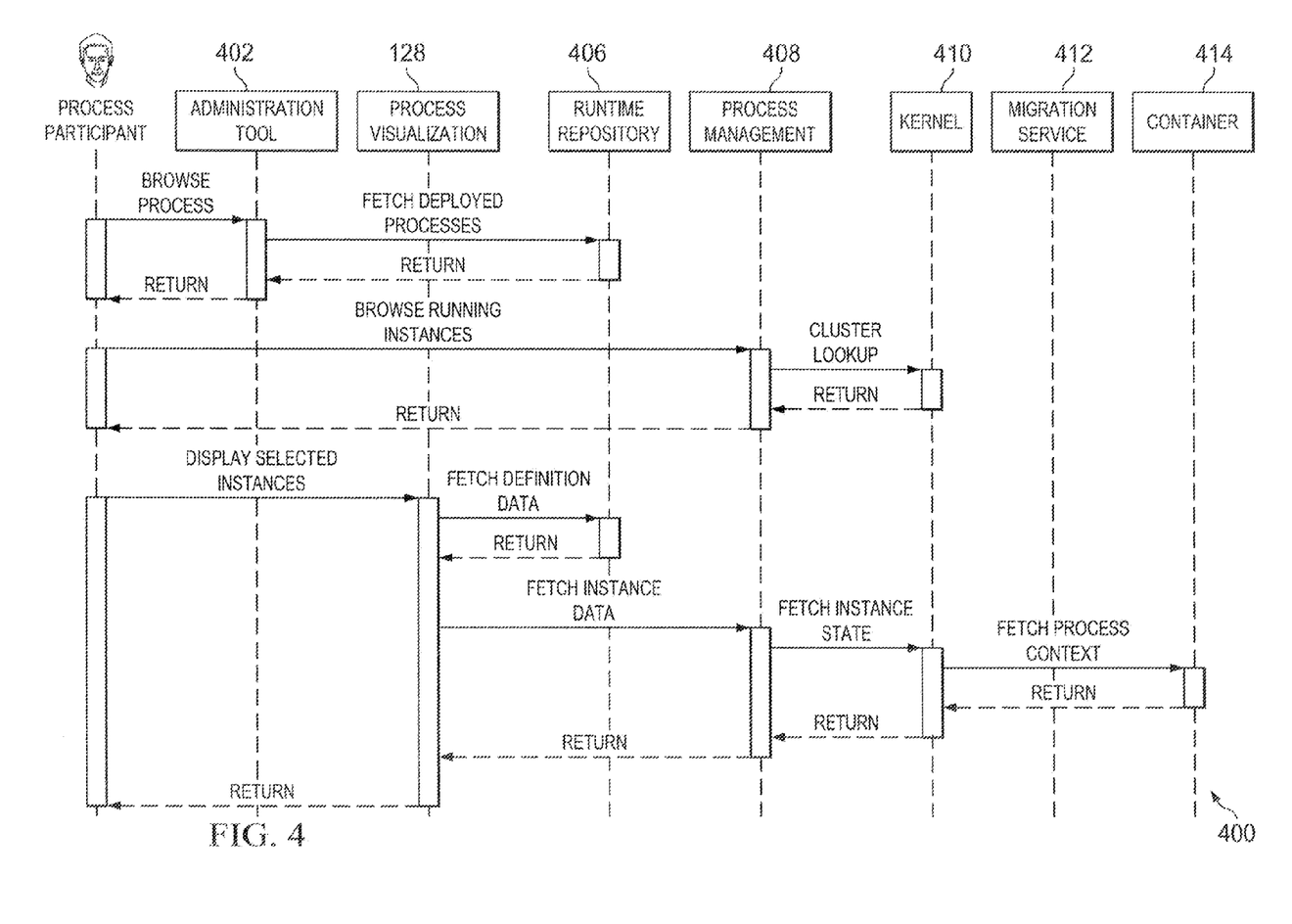
FIG. 4 is an example flow sequence for browsing and displaying a process instance using an appropriate system, such as the system described in FIG. 1.

FIG. 4 illustrates an example flow sequence 400 for browsing and displaying a process instance in detail. The user may access a BPMS system 210 through a central administration tool 402, which also wraps the process visualization front end. To display a specific process instance, the user initially fetches the list of deployed processes from a "Runtime Repository" 406 that is the central process definition storage. Once the deployed processes have been fetched, the user may choose a specific process instance to be displayed. Next, the user may browse for a specific process instance which may be located somewhere in the (distributed) BPMS cluster. Here, the user may utilize a "Process Management" functionality 408 of the BPMS system 210 that uses the BPMS "Kernel" 410 to retrieve all process instances from across the cluster. Finally, the "Process Visualization" component 128, including the ad-hoc change web tool 128, retrieves the underlying process model including definition data from the "Runtime Repository" 406 and continues to fetch the specific instance data from the "Process Management" component 408 which is part of the "Process Runtime" service to display a specific instance. The "Process Management" functionality 408 fetches some (control-flow related) instance data from the BPMS "Kernel" 410 and some additional context data from the data "Container" 414.

Figure 5:
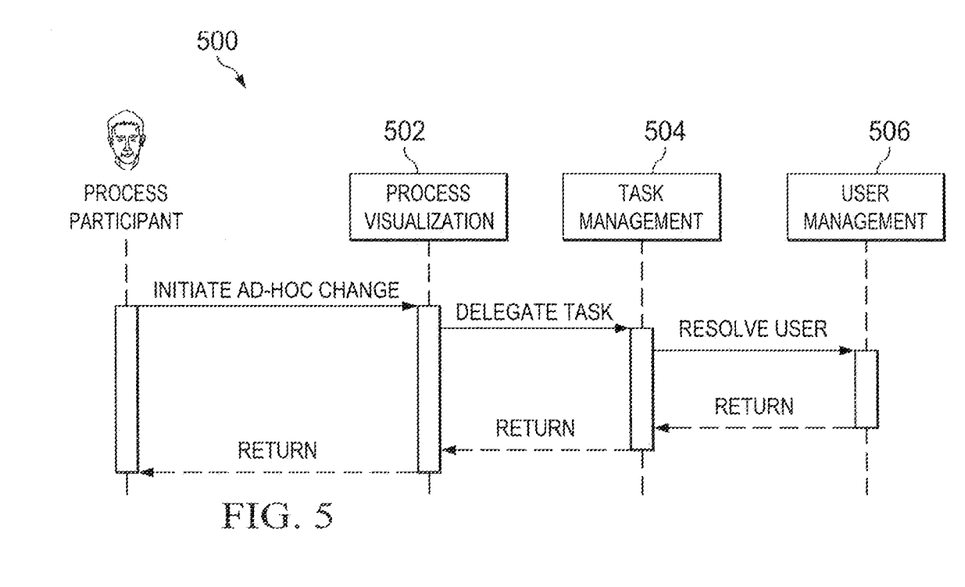
FIG. 5 is an example flow sequence depicting the runtime components involved in a selected ad-hoc change for delegating a task to another end user using an appropriate system, such as the system described in FIG. 1.

FIG. 5 depicts an example flow sequence 500 and the runtime components involved in a selected ad-hoc change for delegating a task to another end user. Typically, a task management infrastructure 504 of a typical BPMS system 210 inherently provides for mechanisms of assigning another user to a running task instance. In effect, a user may utilize the ad-hoc change tool 128 to invoke a "Process Visualization" tool 502. The "Process Visualization" tool 502 in turn invokes a proprietary operation of the "Task Management" component 504 which performs the task delegation. Internally, the "Task Management" component 504 may need to resolve the new user in the application server's user management component 506. The ad-hoc change of a process instance illustrated in FIG. 5 represents a limited ad-hoc change restricted to pre-existing operations as offered by various components of a BPMS stack. Examples of BPMS components that may provide pre-existing operations for implementing ad-hoc changes include Task Management (including operations such as delegate task, revoke task, change task deadlines, escalate task), Process Management (including operations such as roll back/compensate process fragment, set back token), Context Management (including operations such as attach document/note, change context variable from outside), User Interface Rendering (including operations such as change task user interface), and Business Rules (including operations such as decision table entry). Other examples involving additional BPMS components, such as data mapping, user management, and the like, may exist.

Pre-existing change operations, such as the operation illustrated in FIG. 5, may be limited in the extent to which the change operations can change a process instance in accordance with a user's particular needs. In order to overcome the limitations to pre-existing change operations, ad-hoc process changes may alternatively use an extensibility framework 208 as provided by a generic application server such as the web application server 102 illustrated in FIG. 2.

In some implementations, ad-hoc changes are implemented by dynamically resolving calls to process building blocks having a well-defined interface using late binding mechanisms. Process building blocks that may have well-defined interfaces include atomic activities, user tasks, subflows, data mappings, user interfaces, and other building blocks. Since certain building blocks of processes may have similar interfaces, an ad-hoc change may replace such a building block with a dynamically generated new building block. An example of this type of extensibility procedure is described below in connection with FIG. 6.

Figure 6:
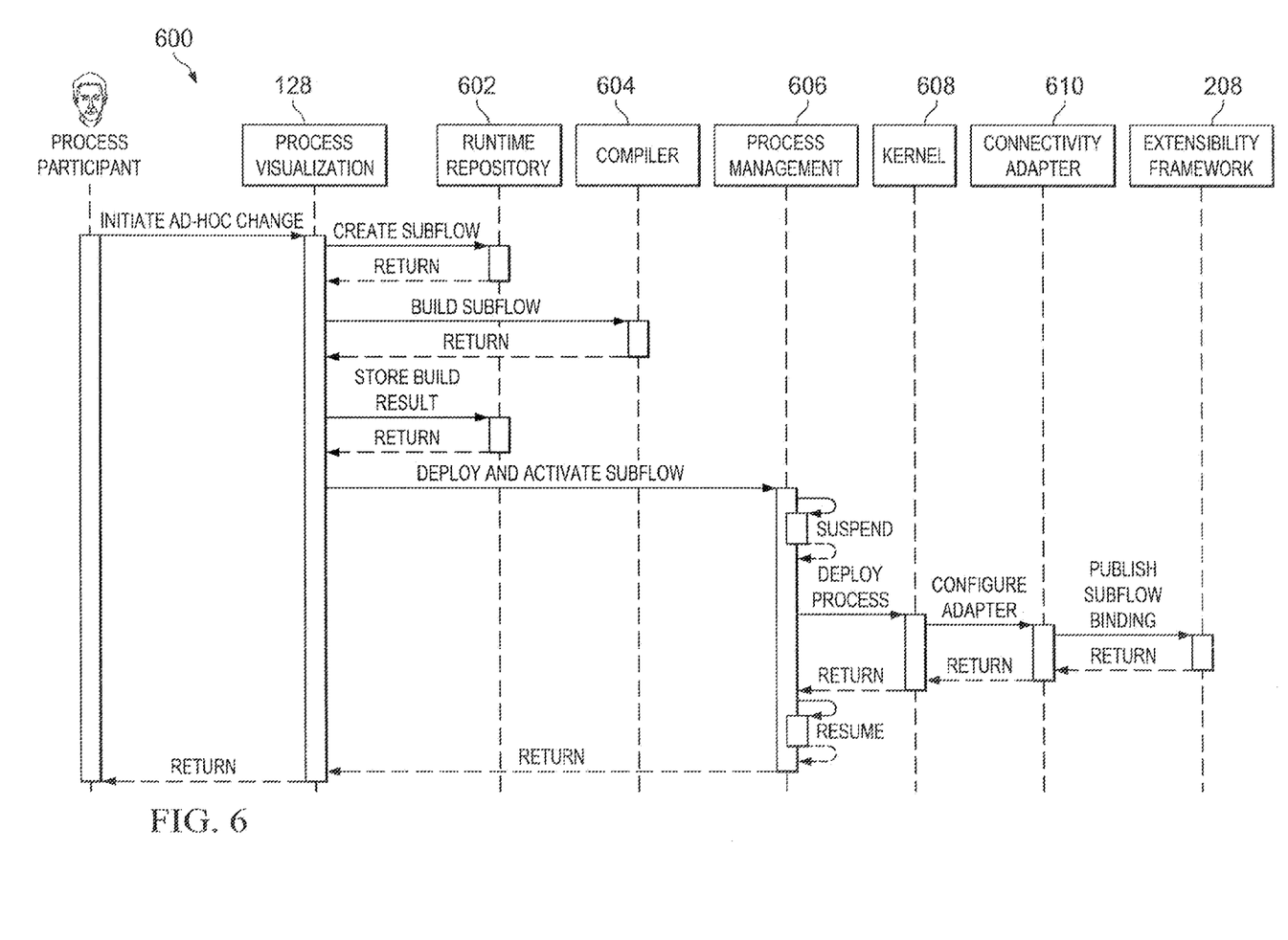
FIG. 6 is an example flow sequence of components involved in extending a process model by replacing a subflow with another compatible subflow using an appropriate system, such as the system described in FIG. 1.

FIG. 6 illustrates an example flow sequence 600 of components involved in extending a process model by replacing a subflow with another compatible subflow. Although FIG. 6 depicts the replacement of subflows, the extension of the process model may apply to any encapsulated process step that adheres to a well-defined technical interface. After an ad-hoc change is initiated using the "Process Visualization" tool 128, the "Process Visualization" tool 128 may initially create a new subflow model incorporating the intended process changes. In some implementations, the subflow may simply be retrieved from a repository of pre-existing process building blocks that can be readily used without the need to dynamically create new subflows and compile them on the fly. For instance, the ad-hoc tool 128 may make any process step that was generated in other contexts available for re-use. The availability of previously generated process steps may be beneficial when a user has already generated a process step using the ad-hoc tool 128 to replace a different process step and has successfully responded to an escalation scenario. Thus, the user may wish to use the same process step in later cases.

In certain instances, the subflow may simply "wrap" an existing, previously deployed process. After the subflow model has been created, its runtime representation may be generated by invoking a "Compiler" component 604 which yields an executable subflow representation. In general, BPMS runtime environments use execution oriented formats such as state charts, Business Process Execution Language (BPEL) models, script languages, or Java classes, at runtime instead of process models such as BPMN diagrams. The newly built subflow is then stored in a "Runtime Repository" 602, and is subsequently deployed and activated. The deployment and activation of the subflow is performed by the "Process Management" component 606. During deployment of the subflow, the "Process Management" component 606 may initially suspend the affected process instance, and forward (or deploy) the executable subflow model ("extension") to the "Kernel" 608 which needs to publish the building block at the "Extensibility Framework" 208, which is later responsible for dynamically resolving calls to the subflow using late binding techniques in which a callee of a process step is only resolved at runtime when that process step is reached. The "Extensibility Framework" 208 is accessed through a connectivity adapter 610, which is an interface to an enterprise service bus (ESB) associated with the "Extensibility Framework" 208. The connectivity adapter 610 allows extensibility options to be available for other content types of the BPMS application server such as Enterprise JavaBeans (EJBs). Finally, the process instance is resumed and may start invoking the replaced subflow.

Process extensibility, as illustrated in FIG. 6 for example, may be a simple and straightforward way of achieving ad-hoc process flexibility. It is limited, however, to existing building block boundaries and to situations in which building blocks are replaced with others having the same interface. Accordingly, although process extensibility permits more extensive changes to a business process than the pre-existing built-in operations, more invasive changes are out of reach of process extensibility. To achieve an even greater deal of flexibility, a process instance may be migrated to an altered process model. In some implementations, the ad-hoc change operation transparently generates an entirely new process model, using the existing process model and process definitions as a basis upon which changes are incorporated. Examples of ad-hoc changes that may require generating a new process model for applying the ad-hoc changes include adding activities to existing control flow branches, adding control flow branches or process fragments that integrate into the process model in a non-block-structured manner, or changing the technical interfaces of building blocks, such as process steps like subflows, user tasks, etc., in an incompatible manner such that plain extensibility mechanisms are not applicable.

Figure 7:
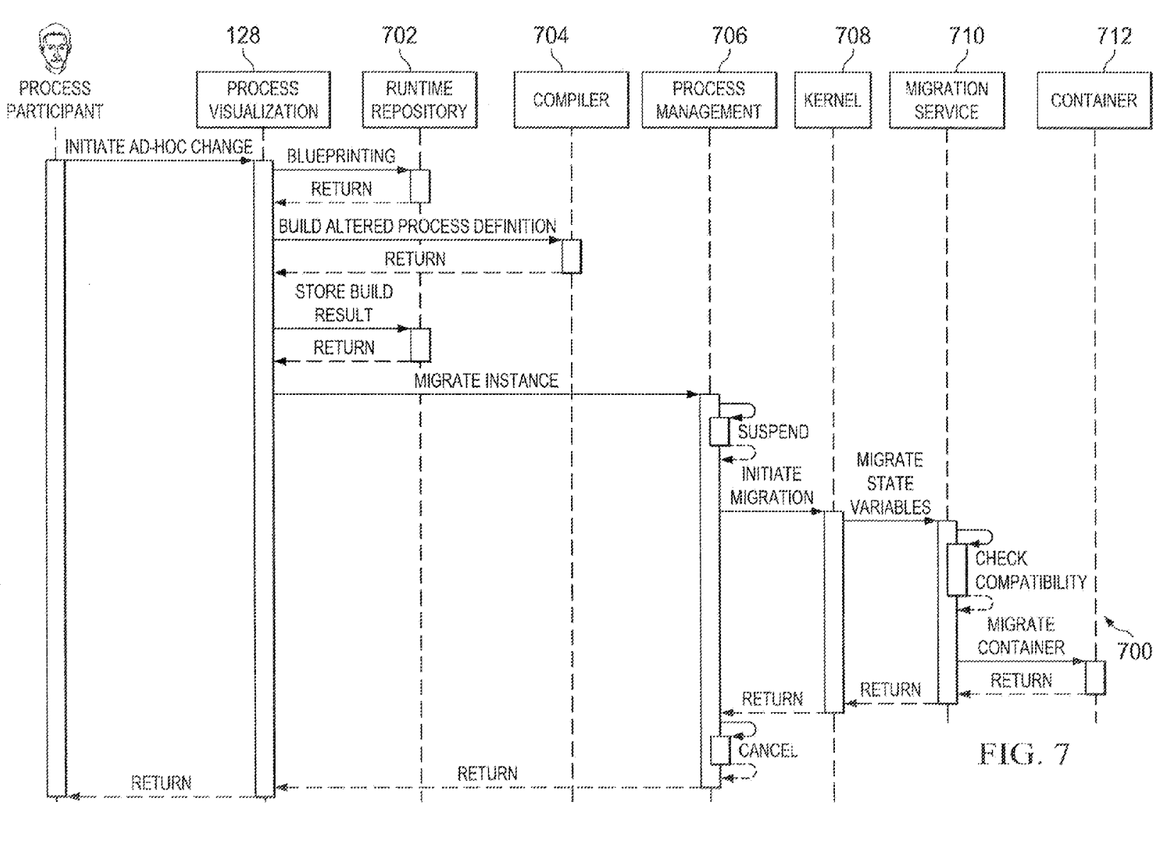
FIG. 7 is an example flow sequence depicting the component interactions in the instance migration case of an appropriate system, such as the system described in FIG. 1.

In the process migration framework, an existing process instance state is transported to the newly generated process model which requires moving and possibly adjusting state variables to have the process instance cleanly resuming its run on top of the new process model. A number of compatibility rules may apply at this stage to avoid incompatible process changes and other undesirable effects, such as process flow deadlocks. For instance, an ad-hoc change may be prevented from removing control flow branches that would lead to a new process model that contradicts the state of the process instance that is to be migrated to the new process model. FIG. 7 illustrates an example flow sequence 700 and the component interactions in the instance migration case. First, a new process model is "blueprinted" (i.e., adapted from the existing process model) after an existing process model associated with the current process instance is retrieved from the "Runtime Repository" 702. The new process model may be built based on the process model and definitions of the current process instance, and the user's requested changes are applied to the new process model. The new process model may be compiled using the compiler 704. The current process instance is then migrated by the "Process Management" component 706 onto the newly established process model, taking into account any applicable compatibility constraints. The "Process Management" component 706 may initiate migration through "Kernel" 708. During migration, a process instance currently under execution may be suspended to implement the migration changes at the "Process Management" component 706. Associated components of the existing process model may also be copied to the new process model by a migration service 710. Thus, migrating a process instance may involve migrating and copying the "Container" component 712, which may include the set of all modeled status variables and is the primary component of the BPMS stack holding process instance data, to the new process model. Once complete, the existing process instance based on the old process model is cancelled.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for providing user interaction options for making ad-hoc changes of process instances at runtime, the method comprising the following operations:

providing process instances of one or more business processes to a client across a network in a process visualization user interface;

receiving a request from the client to initiate an ad-hoc change of a selected process instance associated with an original process model;

providing user interaction options for implementing the ad-hoc change to the client, the user interaction options provided in the process visualization user interface;

receiving a selection of a particular user interaction option for implementing the ad-hoc change from the client; and implementing the ad-hoc change of the selected process instance at runtime for the original process model associated with the selected process instance, wherein implementing the ad-hoc change of the selected process instance at runtime comprises:

generating a revised process model based on the original process model, the revised process model further including at least one change associated with the selected user interaction option, wherein the original process model is maintained separate from the revised process model;

automatically migrating the selected process instance from the original process model to the revised process model at runtime by moving at least a portion of a process instance state associated with the selected process instance to the revised process model, wherein the process instance state is distinct from the original process model and the revised process model;

executing, after completing the migration, the revised process model using the moved process instance state; and cancelling, while the revised process model is executing, the execution of the original process model.

2. The method of claim 1, wherein the process instances are associated with a particular Business Process Management Suite (BPMS) system.

3. The method of claim 1, wherein providing the user interaction options for implementing the ad-hoc change comprises aggregating pre-existing options available from runtime frameworks associated with an underlying Business Process Management Suite (BPMS) system and presenting the pre-existing options in the process visualization user interface.

4. The method of claim 1, wherein providing the user interaction options for implementing the ad-hoc change further comprises applying a set of constraints to the user interaction options provided to the client, the set of constraints prohibiting an ad-hoc change contrary to a business intent of the selected process instance.

5. The method of claim 4, wherein the set of constraints applied to the user interaction options provided to the client include compatibility rules to avoid at least one of:
incompatible process changes or process deadlocks.

6. The method of claim 5, wherein the compatibility rules are applied based on the process instance state of the selected process instance.

7. The method of claim 1, wherein the client user interaction options are selected based at least in part on a business context associated with the selected process instance.

8. The method of claim 1, wherein the process instance state copied during migrating the selected process instance from the original process model to the revised process model at runtime includes a container component.

9. The method of claim 8, wherein the container component includes at least one of the following:
at least one status variable or at least of stack data instance.

10. The method of claim 1, wherein migrating the selected process instance from the original process model to the revised process model includes compiling the revised process model after generating the revised process model.

11. The method of claim 1, wherein migrating the selected process instance from the original process model to the revised process model further comprises:
suspending the selected process instance; and
resuming the selected process instance using the revised process model.

12. The method of claim 1, further comprising, after migration, executing the selected process instance based on the revised process model.

13. The method of claim 4, wherein the set of constraints applied to the user interaction options provided to the client are determined based on a user role associated with the client.

14. A computer program product encoded on a non-transitory tangible storage medium, the product comprising computer readable instructions for causing one or more processors to perform operations comprising:
providing process instances of one or more business processes to a client across a network in a process visualization user interface;
receiving a request from the client to initiate an ad-hoc change of a selected process instance associated with an original process model;
providing user interaction options for implementing the ad-hoc change to the client, the user interaction options provided in the process visualization user interface;
receiving a selection of a particular user interaction option for implementing the ad-hoc change from the client; and
implementing the ad-hoc change of the selected process instance at runtime for the original process model associated with the selected process instance, wherein implementing the ad-hoc change of the selected process instance at runtime comprises:
generating a revised process model based on the original process model, the revised process model further including at least one change associated with the selected user interaction option, wherein the original process model is maintained separate from the revised process model;
automatically migrating the selected process instance from the original process model to the revised process model at runtime by moving at least a portion of a process instance state associated with the selected process instance to the revised process model, wherein the process instance state is distinct from the original process model and the revised process model;
executing, after completing the migration, the revised process model using the moved process instance state; and
cancelling, while the revised process model is executing, the execution of the original process model.

15. The computer program product of claim 14, wherein providing the user interaction options for implementing the ad-hoc change comprises aggregating pre-existing options available from runtime frameworks associated with an underlying Business Process Management Suite (BPMS) system and presenting the pre-existing options in the process visualization user interface.

16. The computer program product of claim 14, wherein providing the user interaction options for implementing the ad-hoc change further comprises applying a set of constraints to the user interaction options provided to the client, the set of constraints prohibiting an ad-hoc change contrary to a business intent of the selected process instance.

17. The computer program product of claim 14, wherein the client user interaction options are selected based at least in part on a business context associated with the selected process instance.

18. A system, comprising:
memory operable to store information associated with process instances of one or more business processes; and
one or more processors operable to:
provide process instances of one or more business processes to a client across a network in a process visualization user interface;
receive a request from the client to initiate an ad-hoc change of a selected process instance associated with an original process model;
provide user interaction options for implementing the ad-hoc change to the client, the user interaction options provided in the process visualization user interface;
receive a selection of a particular user interaction option for implementing the ad-hoc change from the client; and
implement the ad-hoc change of the selected process instance at runtime for the original process model associated with the selected process instance, wherein implementing the ad-hoc change of the selected process instance at runtime comprises:
generating a revised process model based on the original process model, the revised process model further including at least one change associated with the selected user interaction option, wherein the original process model is maintained separate from the revised process model;
automatically migrating the selected process instance from the original process model to the revised process model at runtime by moving at least a portion of a process instance state associated with the selected process instance to the revised process model, wherein the process instance state is distinct from the original process model and the revised process model;
executing, after completing the migration, the revised process model using the moved process instance state; and
cancelling, while the revised process model is executing, the execution of the original process model.

19. The system of claim 18, wherein providing the user interaction options for implementing the ad-hoc change comprises aggregating pre-existing options available from runtime frameworks associated with an underlying Business Process Management Suite (BPMS) system and presenting the pre-existing options in the process visualization user interface.

* * * * *